(12) United States Patent
    Knowles (10) Patent No.: US 9,919,788 B2
(45) Date of Patent: Mar. 20, 2018

(54) TECHNIQUE TO FACILITATE INSTALLATION OF MOTORIZED WINDOW SHADE MECHANISM IN AIRCRAFT

(75) Inventor: Byron R. Knowles, W. Palm Beach, FL (US)

(73) Assignee: Aerospace Technologies Group, Inc., Boca Raton, FL (US)

( * ) Notice: Subject to any disclaimer, the term of this patent is extended or adjusted under 35 U.S.C. 154(b) by 0 days.

(21) Appl. No.: 13/978,299

(22) PCT Filed: Jan. 12, 2012

(86) PCT No.: PCT/US2012/021115
§ 371 (c)(1),
(2), (4) Date: Sep. 18, 2013

(87) PCT Pub. No.: WO2012/097176
PCT Pub. Date: Jul. 19, 2012

(65) Prior Publication Data
US 2013/0340957 A1    Dec. 26, 2013

Related U.S. Application Data

(60) Provisional application No. 61/432,438, filed on Jan. 13, 2011.

(51) Int. Cl.
    *E06B 3/32*      (2006.01)
    *B64C 1/14*      (2006.01)
(52) U.S. Cl.
    CPC .......... *B64C 1/1484* (2013.01); *B64C 1/1492* (2013.01)

(58) Field of Classification Search
    CPC ... B64C 1/1476; B64C 1/1484; B64C 1/1492; E06B 9/01; E06B 9/52; E06B 9/264; E06B 2009/2646
    USPC .................................. 160/89, 90; 244/129.3
    See application file for complete search history.

(56) References Cited

U.S. PATENT DOCUMENTS

| | | | |
|---|---|---|---|
| 3,137,901 A * | 6/1964 | Malachowski | ....... E06B 3/5481 160/369 |
| 3,691,686 A | 9/1972 | Donegan | |
| 4,679,610 A | 7/1987 | Spraggins | |
| 4,869,670 A | 9/1989 | Ueda et al. | |
| 4,991,638 A | 2/1991 | Magee et al. | |
| 5,282,504 A * | 2/1994 | Anderson | ................. E06B 9/01 160/107 |

(Continued)

FOREIGN PATENT DOCUMENTS

WO    WO 2007/107511    9/2007

*Primary Examiner* — Katherine W Mitchell
*Assistant Examiner* — Abe Massad
(74) *Attorney, Agent, or Firm* — Cozen O'Connor (57) ABSTRACT

Systems and methods for installing a motorized window shade assembly on an aircraft window panel having fastener receiving elements and an electrical access port. A receptacle frame includes a front face bounded by side walls defining a volume for receiving the window shade assembly. The frame further includes a rear face having window panel fasteners adapted to engage with the fastener receiving elements of the aircraft window panel and adapted to secure the receptacle frame to the aircraft window panel. The frame further includes window shade assembly fasteners positioned on at least a first pair of the side walls and adapted to secure the window shade assembly within the volume for receiving the window shade assembly.

17 Claims, 9 Drawing Sheets

(56) References Cited

U.S. PATENT DOCUMENTS

| | | | |
|---|---|---|---|
| 5,988,566 A * | 11/1999 | Meyer | 244/129.3 |
| 6,186,211 B1 * | 2/2001 | Knowles | 160/84.02 |
| 6,227,491 B1 | 5/2001 | Stephan et al. | |
| 6,786,453 B2 | 9/2004 | Jones | |
| 7,690,414 B2 * | 4/2010 | Knowles | 160/90 |
| 7,823,833 B2 * | 11/2010 | Wood | 244/129.3 |
| 8,123,168 B2 * | 2/2012 | Switzer et al. | 244/129.3 |
| 8,220,521 B2 * | 7/2012 | Tischer et al. | 160/310 |
| 2003/0015624 A1 | 1/2003 | Sanz et al. | |
| 2008/0078877 A1 * | 4/2008 | Switzer | B64C 1/1492 244/129.3 |
| 2008/0099615 A1 | 5/2008 | Steiner et al. | |
| 2008/0230653 A1 * | 9/2008 | Mitchell | B60J 3/04 244/129.3 |
| 2009/0241424 A1 * | 10/2009 | Mohat | B64C 1/1484 49/349 |
| 2012/0318466 A1 * | 12/2012 | Mohat et al. | 160/90 |

* cited by examiner

TECHNIQUE TO FACILITATE INSTALLATION OF MOTORIZED WINDOW SHADE MECHANISM IN AIRCRAFT

CROSS-REFERENCE TO RELATED APPLICATIONS

This application claims the benefit of U.S. Provisional Patent Application No. 61/432,438, filed on Jan. 13, 2011, which is hereby incorporated by reference in its entirety.

BACKGROUND OF THE INVENTION

1. Field of the Invention

The present invention is directed to a system for installation of a motorized window shade assembly in an aircraft. More particularly, the present invention is directed to a receptacle frame for facilitating the attaching/detaching of a motorized window shade assembly to/from an airplane window.

2. Description of the Related Art

Known motorized window shade assemblies for aircraft are directly mounted to internal panels of an airplane using screws or other types of fastening hardware which connect the shade assembly to an airplane window panel and interface the electronic components of the shade assembly with the airplane power bus. Such a mounting requires skill in the manipulation of tools, such as to apply an appropriate amount of torque to the fastening hardware, and is also time consuming. Once the shade assembly is installed, the fastening hardware is then concealed from the airplane passengers by use of an overlay panel. The direct mounting of window shade assemblies to the aircraft internal panels can introduce unwanted loads and binding forces to the moving components of the shade assembly. Moreover, the replacement of a shade assembly mounted directly to an internal panel of an airplane is relatively time consuming as it requires access to the fastening hardware and the use of tools to disengage an existing window shade assembly from the aircraft window and connect a new/replacement window shade assembly.

A significant cost associated with the operation of airplanes and, in particular, passenger airplanes—both commercial and private—results from maintenance and repair. The cost is not just from the expense of replacement parts and components, as well as the man-hours needed for such activities, but from the length of time an airplane is removed from service and is, thus, being unused. Accordingly, it is desirable to reduce the cost of installation and replacement of airline components and, in particular, motorized window shade assemblies, thereby reducing the amount of time an airplane is out of service as a result of such repair and maintenance.

SUMMARY OF THE INVENTION

One object of the present invention is to facilitate the installation and removal of a motorized shade assembly to/from an aircraft.

Another object of the present invention is to provide a receptacle frame for a motorized shade assembly adapted for a window of an airplane so that the window shade assembly can be easily and quickly installed and removed from the airplane window. The terms "receptacle," "receptacle frame," and "frame" are used interchangeably herein and refer to a mounting device for connecting a motorized window shade assembly to an aircraft.

Another object of the present invention is to provide a receptacle frame for a motorized shade assembly of an airplane, with the receptacle frame providing electrical connection between the motorized shade assembly and the airplane, as well as providing an interface between the shade assembly and the airplane.

In yet another object of the present invention, a receptacle frame for a motorized window shade assembly for an airplane is provided wherein the receptacle frame minimizes unwanted binding point forces between the window shade assembly and the aircraft.

These and other objects are attained in accordance with one aspect of the present invention directed to a receptacle frame for a motorized window shade assembly for an airplane. The receptacle frame includes a first face configured for fastening to a sidewall window panel of the airplane, and a second face having first and second pairs of sidewalls. The receptacle frame sidewalls define a receiving volume dimensioned for receiving the motorized window shade assembly. The receptacle frame also provides an access connection to an electronic power bus of the airplane such that when the shade assembly is received in the receiving volume in the intended manner, an electronic connection is formed between the shade assembly and the power bus. Positioned along on or more of the sidewalls are fastening means for releasably securing the shade assembly in the receiving volume without requiring any external and separate fasteners. With the motorized shade assembly in place in the receiving volume, an internal framing panel, or bezel, is connected over the shade assembly.

In another aspect, a system is provided for installing a motorized window shade assembly on an aircraft window panel having fastener receiving elements and an electrical access port. A receptacle frame includes a front face bounded by side walls defining a volume for receiving the window shade assembly. The frame further includes a rear face having window panel fasteners adapted to engage with the fastener receiving elements of the aircraft window panel and adapted to secure the receptacle frame to the aircraft window panel. The frame further includes window shade assembly fasteners positioned on at least a first pair of the side walls and adapted to secure the window shade assembly within the volume for receiving the window shade assembly In another aspect, a method is provided for installing a motorized window shade assembly on an aircraft window panel having fastener receiving elements and an electrical access port. The method includes providing a receptacle frame having a front face bounded by side walls defining a volume for receiving the window shade assembly; a rear face having window panel fasteners adapted to engage with the fastener receiving elements of the aircraft window panel and adapted to secure the receptacle frame to the aircraft window panel; a receptacle frame port formed in one of the side walls and positioned to align with the electrical access port of the aircraft window panel; a receptacle frame electrical assembly comprising an aircraft power bus electrical connector installed in the receptacle frame port and adapted to interface with an aircraft electrical power bus; and window shade assembly fasteners positioned on at least a first pair of the side walls and adapted to secure the window shade assembly within the volume for receiving the window shade assembly, the window shade assembly fasteners comprising flexible tabs which extend from, or form at least a portion of, the first pair of the side walls.

The method further includes inserting a first end of the window shade assembly into the volume for receiving the window shade assembly at an angle relative to the front face of the receptacle frame so that the first end of the window shade assembly is positioned between at least a first flexible tab, of the flexible tabs, and the front face of the receptacle frame; and rotating the window shade assembly about the first end thereof so that a second end of the window shade assembly moves into the volume for receiving the window shade assembly and becomes secured by at least a second flexible tab, of the flexible tabs. As the window shade assembly is inserted and rotated, the aircraft power bus electrical connector installed in the receptacle frame port forms an electrical connection with the an aircraft electrical power bus.

In one embodiment, the first pair of sidewalls include a top wall and a bottom wall of the receiving volume and the fastening means are resilient tabs dimensioned for seating about a front face of the shade assembly to result in a snap-fit engagement between the shade assembly and the receptacle frame. The resilient tabs can be flexed away from the receiving volume to allow for easy removal of the shade assembly from the receptacle frame during replacement of the shade assembly.

In another embodiment, an opening is presented in the bottom wall, through which an electrical connector extends for mating with a like electrical connector on the bottom surface of the shade assembly for providing operating power from the airplane power bus to the shade assembly.

In still another embodiment, the second pair of sidewalls includes a right-side wall and a left-side wall. These side walls support resilient alignment features for maintaining alignment of the shade assembly in the receiving volume. The alignment features are, preferably, flexible tabs extending into the receiving volume and dimensioned for pressing against the sides of the shade assembly when the shade assembly is positioned in the receiving volume.

BRIEF DESCRIPTION OF THE DRAWINGS

The above and other objects and advantages of the disclosed subject matter will be apparent upon consideration of the following detailed description, taken in conjunction with accompanying drawings, in which like reference characters refer to like parts throughout, and in which.

DETAILED DESCRIPTION OF THE PRESENTLY PREFERRED EMBODIMENTS

Figure 1:
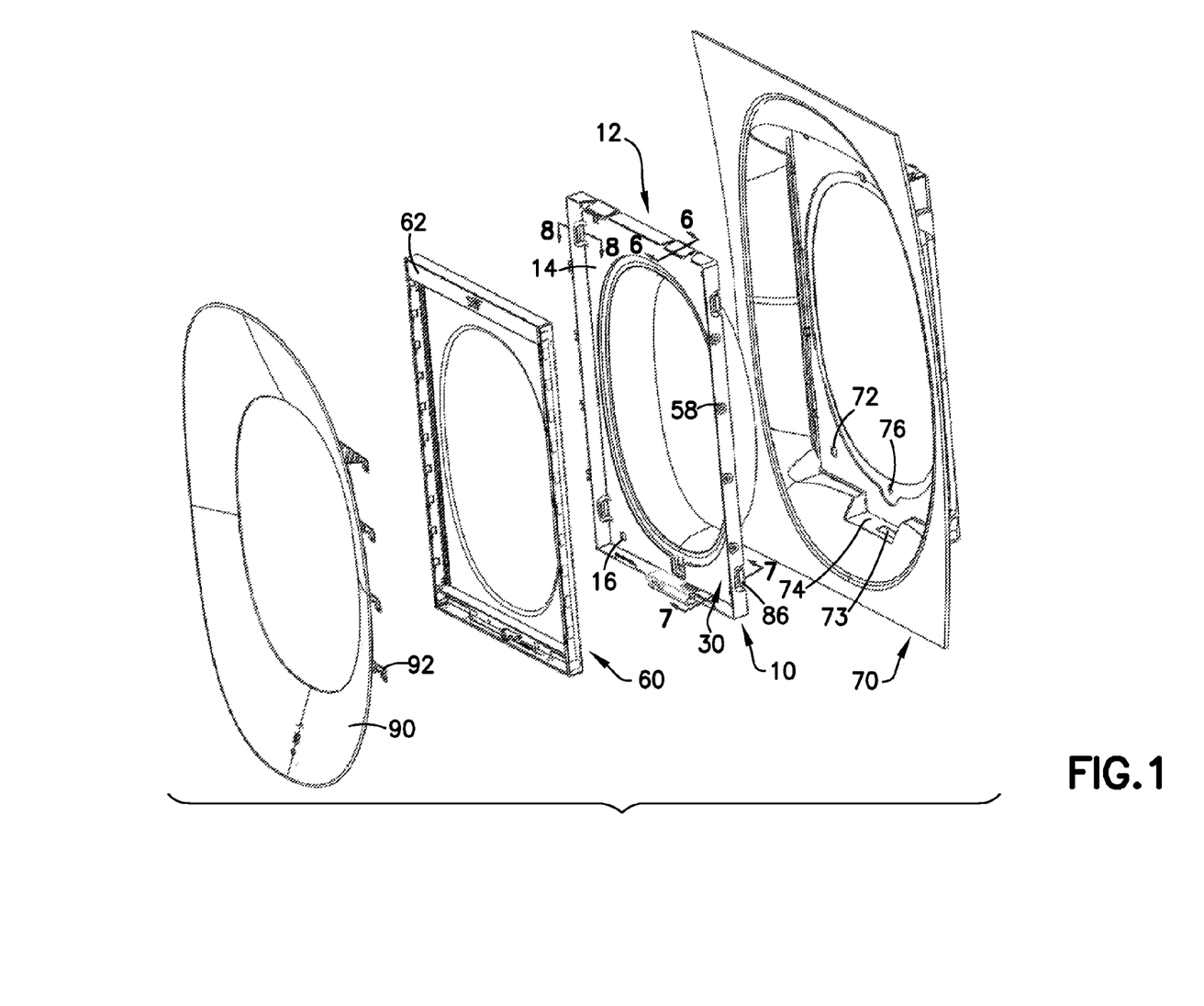
FIG. 1 is an exploded perspective view of a window shade assembly for an airplane.

With reference to FIG. 1, a receptacle frame 10 is provided for mounting a motorized shade assembly 60 to a side window panel 70 of an airplane. The motorized shade assembly employs drive motors for controlling one or more shades which are selectively extended or retracted across the airplane window panel based on a forward or reverse direction of the operating motors. Operating details of examples of motorized shade assemblies for use in airplanes are disclosed in U.S. Pat. Nos. 6,186,211 and 7,690,414 as well as in U.S. patent application Ser. No. 12/943,569. Further discussion on the operation of the shade assembly is believed to not be necessary for an understanding of the invention disclosed herein.

With continued reference to FIG. 1, the airplane window panel 70 is provided with mounting details (not shown) to accommodate attachment to the inside wall of an airplane, in a manner well known to those in the art. The airplane window panel 70 has an access port 73 located in an offset region 74 which provides access to an airplane power bus (not shown) for providing operating power to the shade assembly 60.

Figure 2:
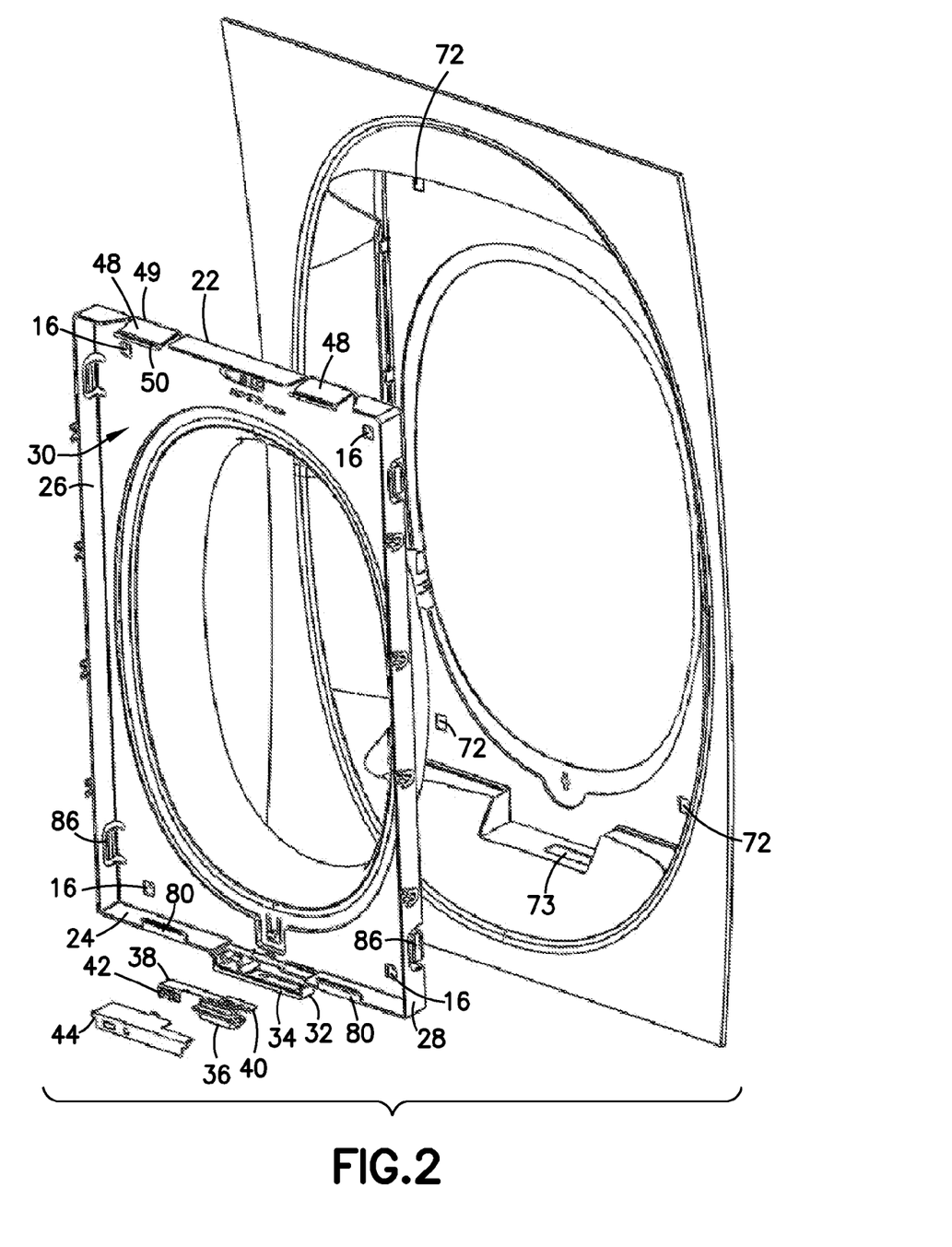
FIG. 2 is an exploded perspective view of a window shade receptacle frame and a window panel of an airplane.
Figure 4:
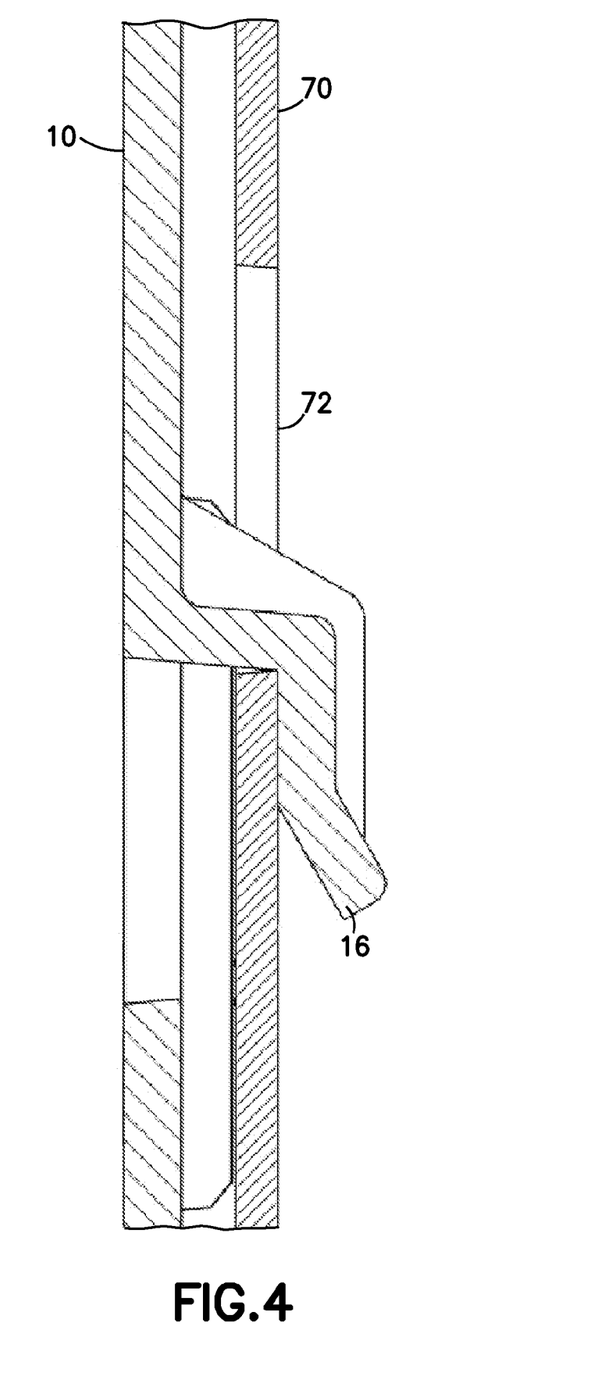
FIG. 4 is a cross-sectional close up of an attachment feature connecting the window shade receptacle frame to the window panel.
Figure 5:
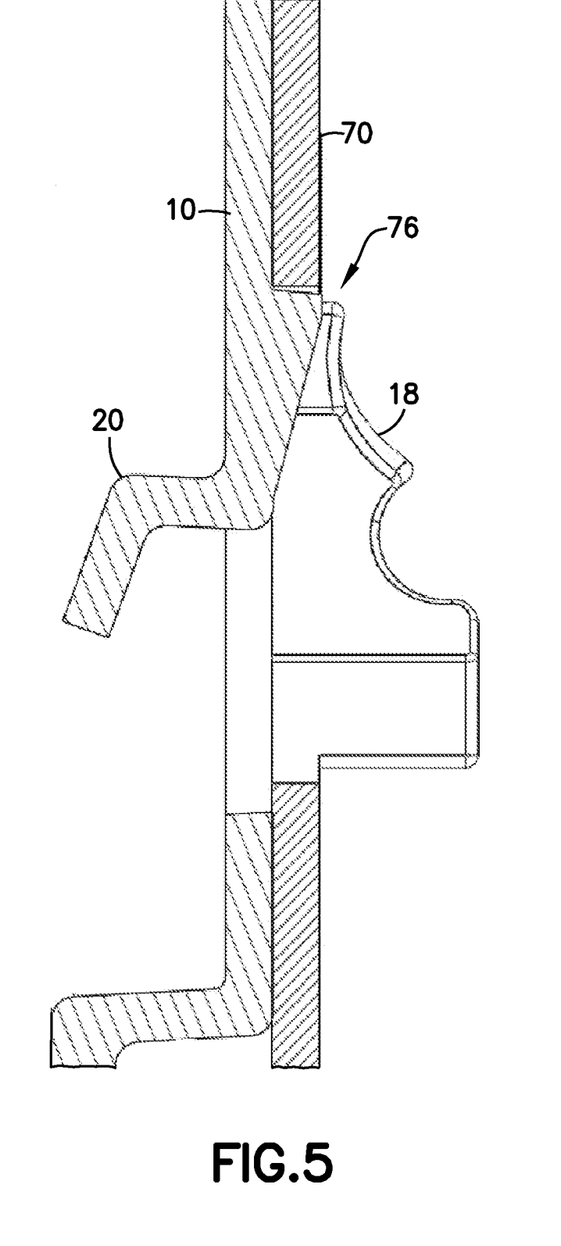
FIG. 5 is a cross-sectional close up of another attachment feature connecting the window shade receptacle frame to the window panel.

The receptacle frame 10 has a rear face 12, and a front face 14, and is attached, at its rear face, to the airplane window panel. As an illustrative example, such attachment may be provided by the use of one or more attachment hooks 16 extending from the rear face 12 of the receptacle frame and seated in a complementary receiving slot 72 in the side window panel 70 (as shown in the close-up view in FIG. 4). A push tab 20 may also be incorporated on the receptacle frame to engage a snap fit connector 18 into a keyhole 76 formed in the window panel to further secure the receptacle frame to the window panel (as shown in the close-up view in FIG. 5). As shown in FIG. 2, the front face 14 of the receptacle frame is bounded by two pairs of side walls having a particular depth and consisting of a top wall 22, a bottom wall 24, a left-side wall 26 and a right-side wall 28. The side walls define a receiving volume 30 for receiving the motorized shade assembly 60, as explained more fully below.

With reference to FIG. 2, the bottom wall 24 of the receptacle frame 10 has an offset region 32 and includes a receptacle frame port 34 which receives an airplane power bus connector (e.g., a multi-pin electrical connector) 36. The offset region 32 of the receptacle frame seats in the offset region 74 of the window panel when the receptacle frame and window panel are connected in the intended manner. When so connected, the receptacle frame port 34 is aligned with the access port 73 of the window panel such that the electrical connector 36 can connect to the airplane power bus through the access port in the window panel.

The electrical bus connector is interfaced with a printed circuit board 38 that is electrically connected, via tracer conductor lines (not shown), to a shade assembly connector 40. The electrical bus connector 36 is also aligned with the access port 73 of the window panel 70 to provide for connection of the receptacle frame to the power bus. The circuit board 38 also includes an operator switch 42 connected by tracer conductor lines (not shown) to the shade assembly connector 40 for controlling operation of the shade assembly, i.e., for raising or lowering one or more shades in the shade assembly, etc. A cover plate 44 is also provided which snap-fits over the offset region 32 of the receptacle frame 10 to cover the circuit board while providing access to the shade assembly connector 40.

Figure 6:
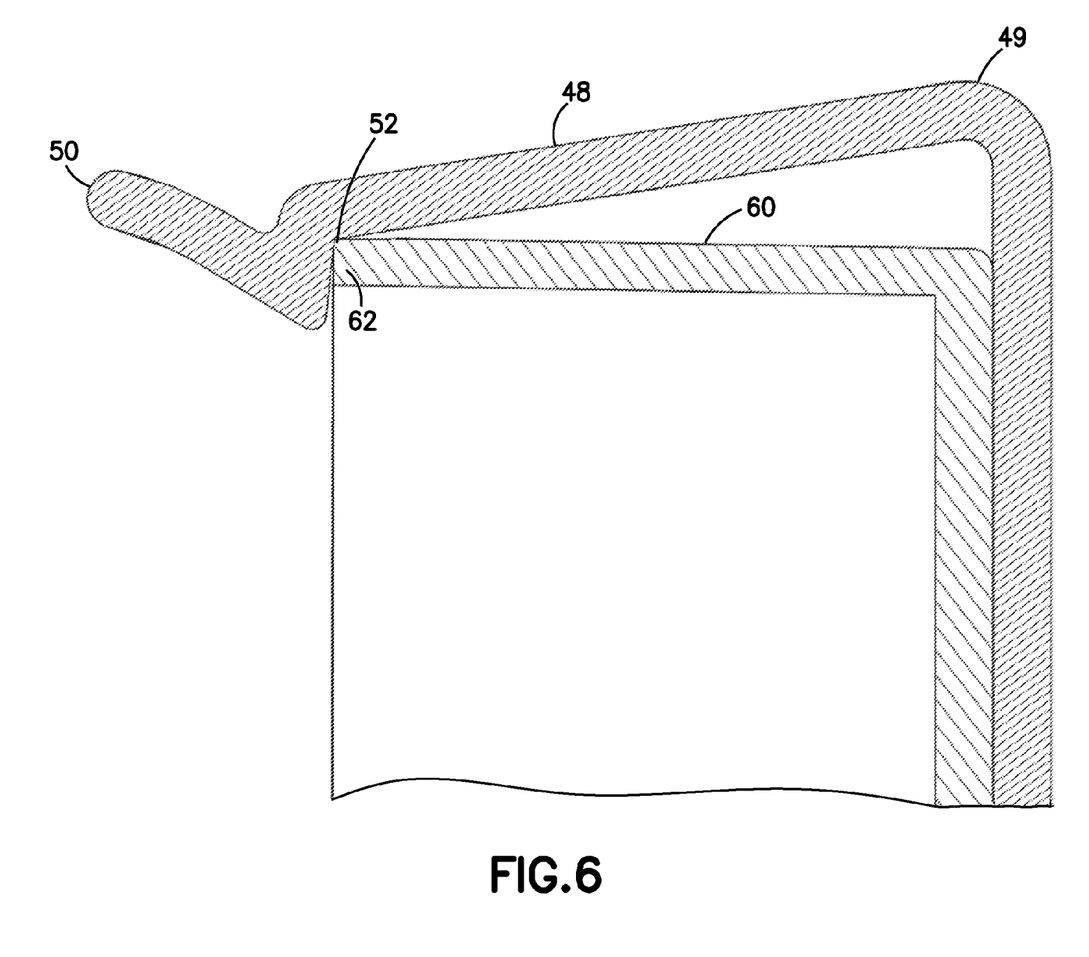
FIG. 6 is a partial cross-section view of an upper securing tab of the window shade receptacle frame taken along line 6-6 of FIG. 1.

As stated above, and with continued reference to FIG. 2, the receptacle frame receiving volume 30 is bounded by the walls 22, 24, 26, and 28, all of which have a certain depth. The depth is preferably dimensioned to accommodate the depth of the shade assembly 60 so that the shade assembly can be completely received in the receiving volume. The shade assembly is secured in the receiving volume by way of fastening means located at the top wall 22 and, preferably, also at the bottom wall 24. The fastening means are preferably configured as flexible tabs 48. In particular, and as shown in FIGS. 2 and 6, the flexible tabs 48 located at the top wall 22, referred to herein as upper tabs 48, are formed from sections of the top wall 22 and have a first end fixed to the receptacle frame, and a free second end 50. Each upper tab is oriented in a slightly downward direction into the receiving volume, as shown, and has an upturned portion at the free second end. The upturned portions define a notch or "elbow" 52 which seats about a front face 62 of the shade assembly as shown in FIG. 6 when the shade assembly is fully received in the receiving volume of the receptacle frame.

Figure 7:
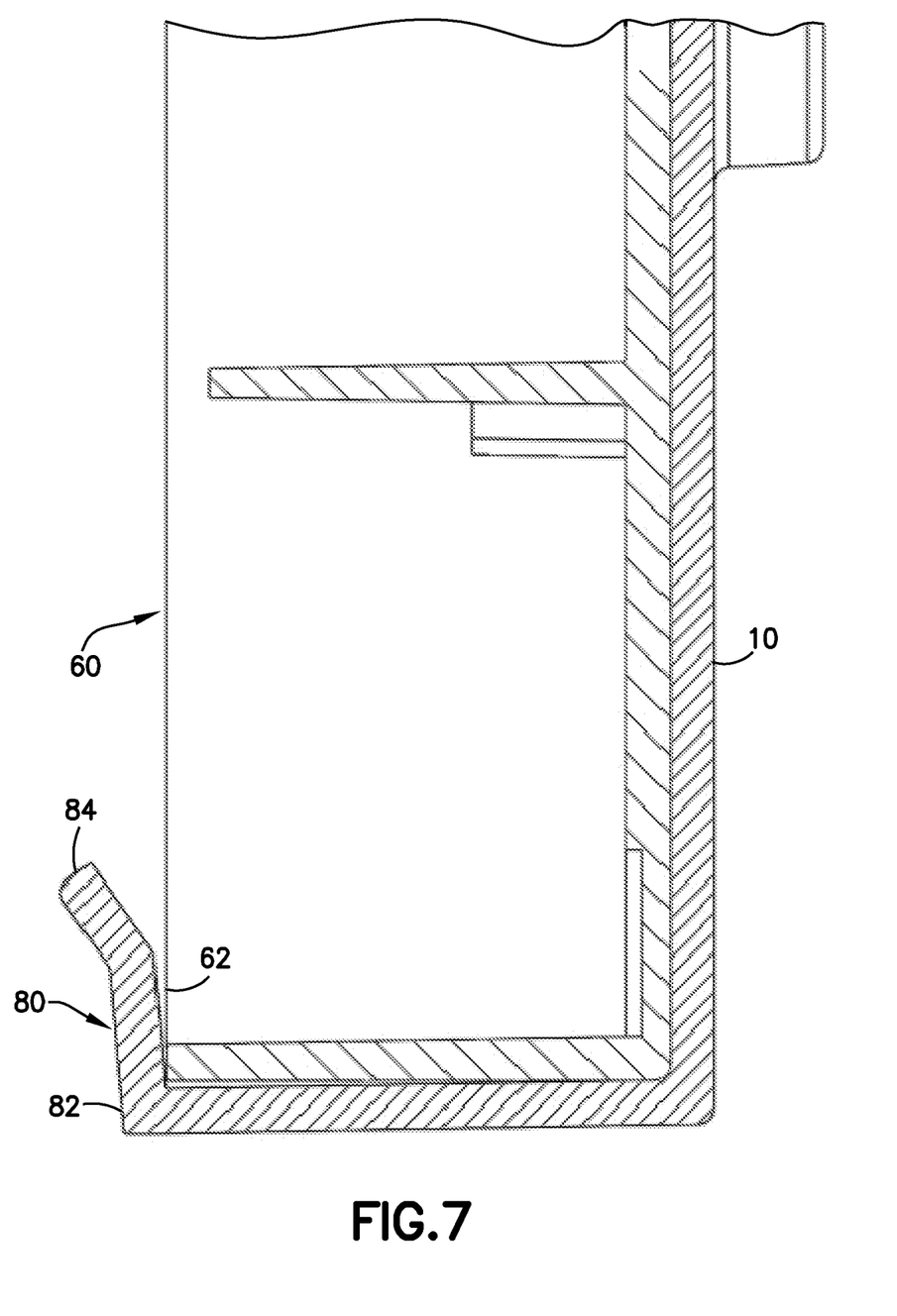
FIG. 7 is a partial cross-section view of a lower securing tab of the window shade receptacle frame taken along line 7-7 of FIG. 1.
Figure 8:
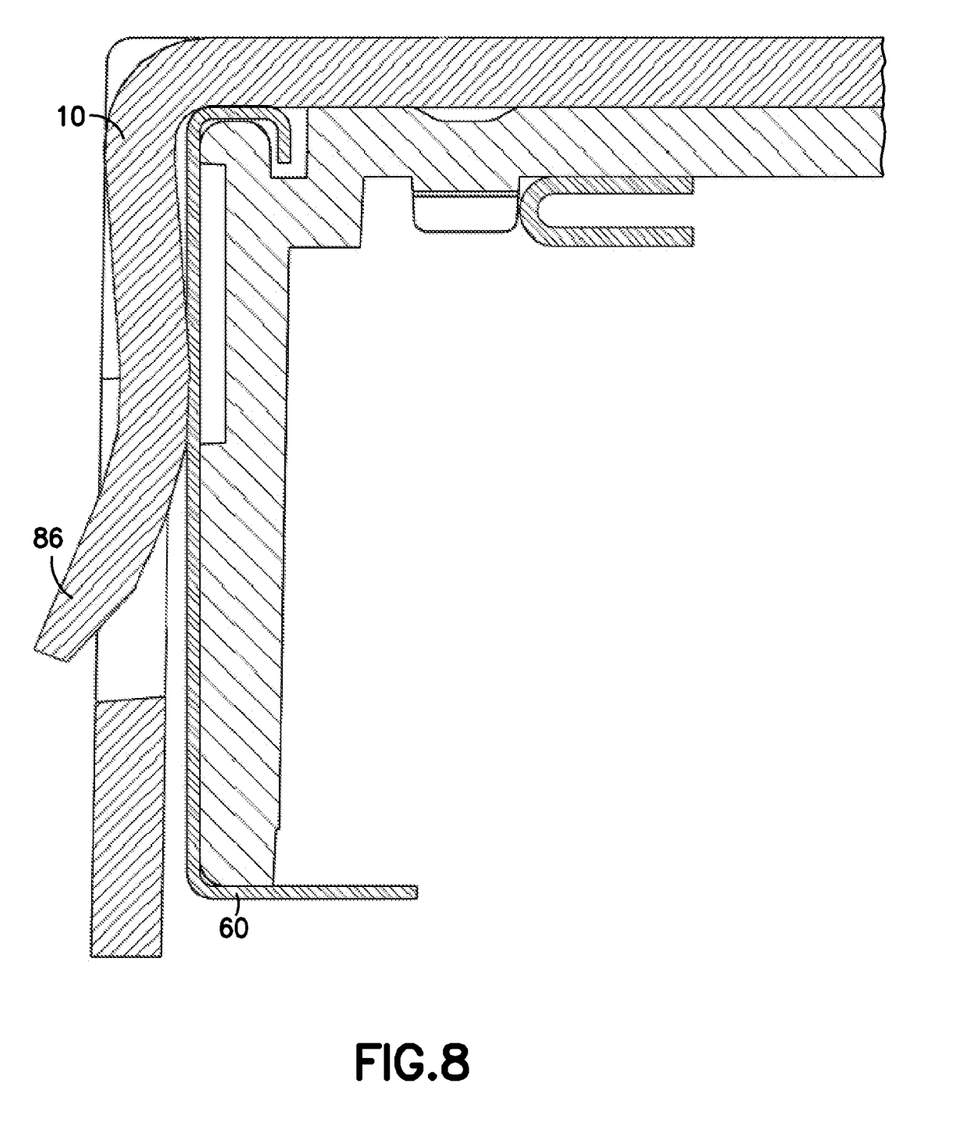
FIG. 8 is a partial cross-section view of an alignment tab of the window shade receptacle frame taken along line 8-8 of FIG. 1.

With reference to FIGS. 2 and 7, the fastening means also includes tabs located at the bottom wall, referred to as lower tabs 80; each has a first end 82 fixed to the bottom wall 24, and a free second end 84. Each lower tab 80, in its free position, is biased to extend slightly inward into the receiving volume 30 and has, at its second end, an outward bent portion which is angled to accommodate insertion of a bottom edge of the shade assembly (FIG. 7).

The left-side wall 26 and right-side wall 28 support one or more alignment tabs 86 which extend inward from each respective side wall. The alignment tabs 86 are preferably located near the top and bottom portions of each side wall and are provided for facilitating seating of the shade assembly 60 in the receiving volume 30.

The receptacle frame 10 is preferably constructed of a moldable, durable and resilient plastic material by known injection molding techniques. Moreover, the fastening means and alignment tabs are integrally formed as part of the receptacle frame and will, thereby, exhibit the resilient properties of the plastic material. For example, the upper tabs 48 are shown as cut-out sections of the top wall 22 and the alignment tabs 86 are shown as cut-out sections of the left-side and right-side walls. Likewise, the lower tabs 80 are integrally formed with the bottom wall 24. In this manner, the fastening means and alignment tabs can be flexed when a force is applied thereto and exert compression forces against regions of the shade assembly in contact with the fastening means and alignment tabs to maintain the shade assembly in a desired position within the receiving volume.

Although injection molding of plastic material is a currently preferred technique for forming the receptacle frame 10, other techniques will be readily known to those of ordinary skill in the art. Moreover, instead of integrally forming the alignment tabs and fastening means with the receptacle frame, those features can be formed separately and attached to the respective side walls. In addition, it will be recognized that greater or fewer upper and lower tabs and alignment tabs can be used and their locations on their respective walls varied without departing from the scope of the invention. For example, a single and larger upper tab centrally located on the top wall may be substituted for the two smaller upper tabs shown in the figures. Likewise, additional alignment tabs or alignment tabs of a larger configuration may be desired, for example to accommodate a larger shade assembly.

Figure 3:
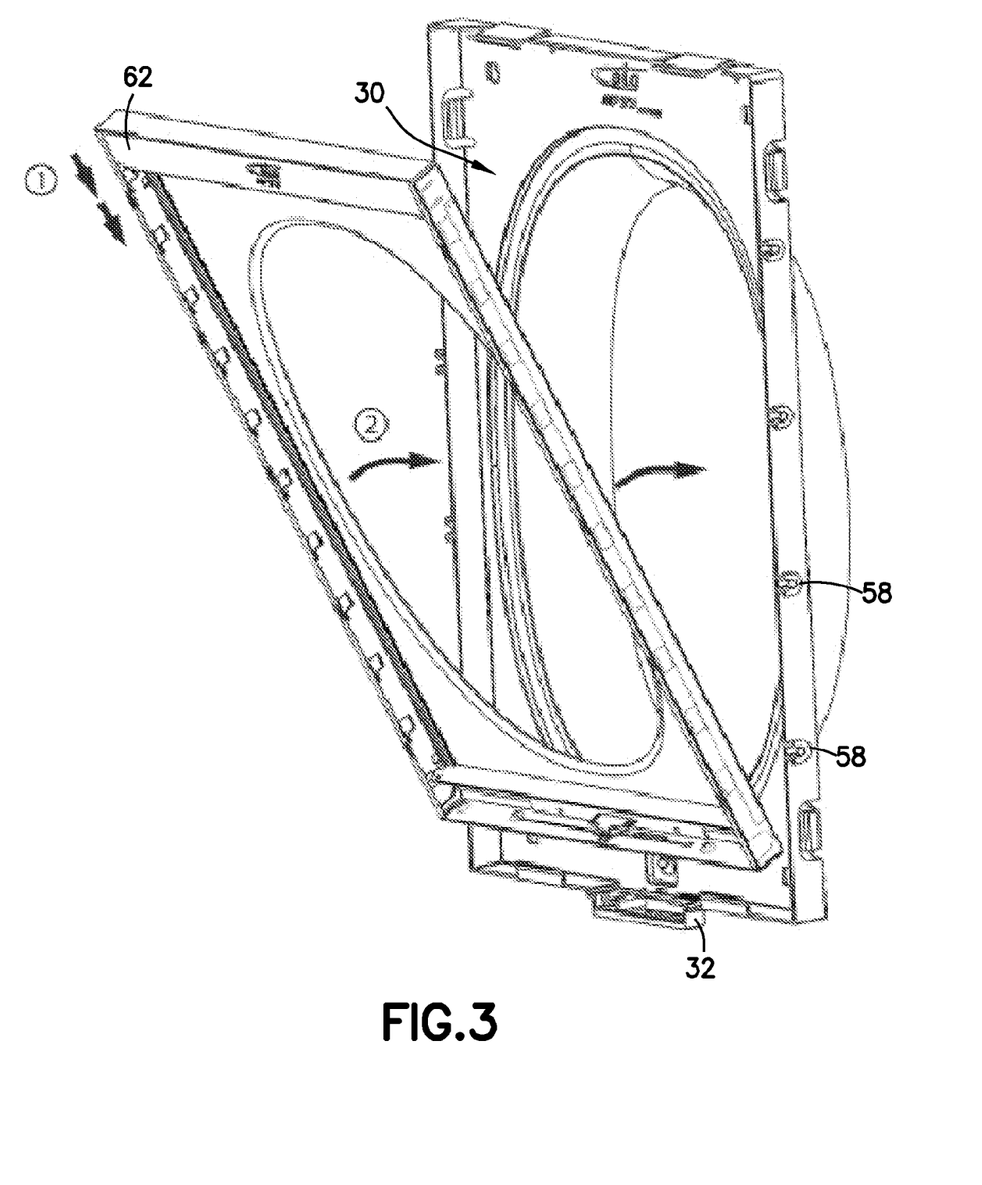
FIG. 3 is a perspective view that depicts the window shade receptacle frame partially received in the window panel.
Figure 9:
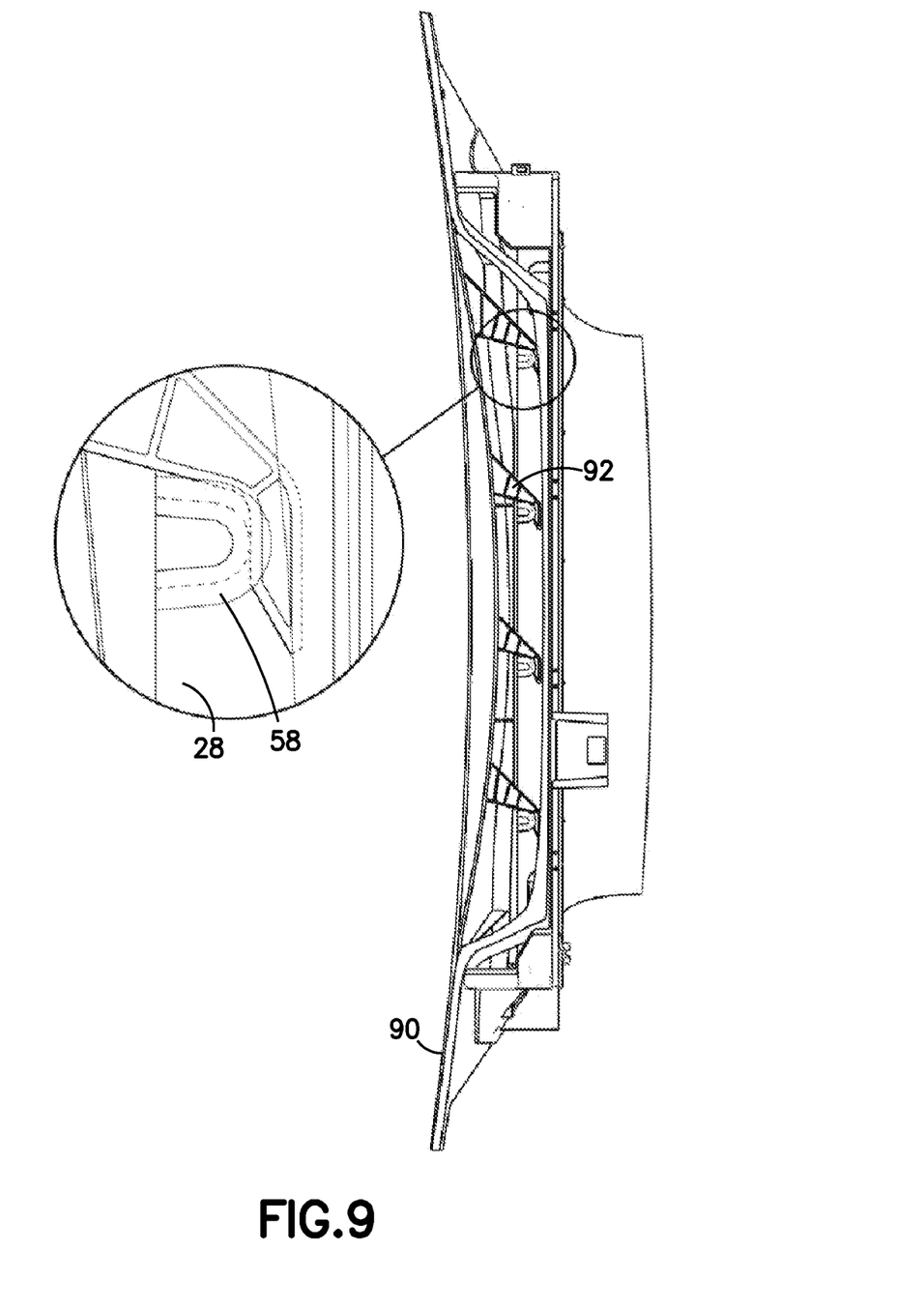
FIG. 9 is a side view of a window shade bezel attached to the receptacle frame of FIG. 1.

Having described the individual features of the receptacle frame for receiving and attaching a motorized shade assembly, both electrically and mechanically, to an airplane, a brief discussion of the use of the receptacle frame will now be provided with reference to FIGS. 1, 3 and 9. With the airplane window panel 70 installed in the airplane, the receptacle frame 10 is then inserted with the back face of the receptacle frame toward the window panel such that the offset region of the receptacle frame seats within the offset region of the window panel. Fastening details on the back face of the receptacle frame are provided to mate with fastening details on the window panel to provide a snap-fit connection. Other fastening hardware, such as screws, can be used in addition to or in place of the snap-fit connection. With the receptacle frame in place in the window panel, the receptacle frame port 34 is aligned with the power bus access port 73 in the window panel 70. Thereafter, the motorized window shade assembly 60 is attached. This is accomplished by angling the window shade assembly such that a bottom wall of the assembly 60 is inserted behind the lower tabs 80 as shown in FIG. 7 and the electrical bus connector 36 contained in the receptacle frame port 34 is coupled to the airplane bus connector via a downward pushing force as shown by directional arrow 1 in FIG. 3. Thereafter, the shade assembly is rotated as shown by directional arrow 2 in FIG. 3 about its bottom surface until the top surface of the shade assembly is in close proximity to the upper tabs. The upper tabs are then manipulated by bending the second ends upward to provide clearance so that the upper edge of the shade assembly can be pushed into the receiving volume. Upon release of the upper tabs, the front face of the shade assembly will seat in the elbow portion of the upper tabs as shown in FIG. 6. As an alternative to manually manipulating the upper tabs, the angles of tab ends 50 may be such that engagement by a leading edge of the shade assembly as the shade installed, will provide an upward camming force on the tabs to allow seating of the upper edge of the shade assembly behind the elbow 52.

It should be noted that as the shade assembly is rotated into position in the receiving volume, the alignment tabs 86 will be flexed outward to accommodate the shade assembly. In this manner, the receptacle frame provides a means of attaching a motorized shade assembly to an airplane while also providing electrical connection of the shade assembly to the power bus.

Once the shade assembly is in place, a bezel 90 can be attached to cover the front of the shade assembly. This is accomplished by way of details 92 configured as hooks extending from a rear side of the bezel. These hooks are received in seats 58 molded to an outer surface of the side walls 26, 28 by aligning the hooks with the seats and applying pressure to engage a snap-fit coupling.

In the event an already-installed shade assembly is inoperative or is otherwise in need of repair, the shade assembly can be quickly and easily replaced with a new one without the need of any specialty tools. This is accomplished by disconnecting the bezel 90 from the receptacle frame 10 by pulling on the bezel to dislodge the hooks 92 from the seats 58. Thereafter, the upper tabs 48 on the receptacle frame can be manipulated in an upward direction to release the upper edge of the shade assembly 60 from the elbow 52, whereupon, the shade assembly can be pivoted out of the receiving volume and separated from the shade assembly connector.

Once the existing shade assembly is removed, a new shade assembly can be installed and the bezel reattached.

As should be apparent, the use of the receptacle frame as described above allows for quick and easy installation of a window shade assembly and for replacement of window shade assemblies, thereby reducing the amount of time an airplane may be out of service for such repairs and maintenance. Moreover, the receptacle frame provides a mechanical buffer, e.g., an isolation, etc., of the shade assembly from the airplane window panel, thereby reducing binding forces that may, otherwise, have a detrimental effect on the shade assembly.

Other embodiments, extensions, and modifications of the ideas presented above are comprehended and should be within the reach of one versed in the art upon reviewing the present disclosure. Accordingly, the scope of the disclosed subject matter in its various aspects should not be limited by the examples presented above. The individual aspects of the disclosed subject matter, and the entirety of the disclosed subject matter should be regarded so as to allow for such design modifications and future developments within the scope of the present disclosure. The disclosed subject matter can be limited only by the claims that follow.

The invention claimed is:

1. A system for installing a motorized window shade module in an exterior sidewall of an aircraft, the aircraft having an aircraft exterior sidewall window panel having fastener receiving elements and an electrical access port, the system comprising:
   a rectangular receptacle frame fastenable to the aircraft exterior sidewall window panel, the receptacle frame comprising:
      a planar panel having a front face, a rear face, and an opening therethrough,
      two opposed pairs of side walls which form a rectangle bounding the front face to define a volume configured to receive the window shade module,
      window panel fasteners on the rear face adapted to engage with the fastener receiving elements of the aircraft exterior sidewall window panel and adapted to secure the receptacle frame to the aircraft exterior sidewall window panel, and
      window shade module fasteners provided for at least a first pair of the two opposed pairs of side walls and adapted to secure the window shade module within the volume for receiving the window shade module,
   wherein the window shade module fasteners comprise:
   at least a first flexible tab, a clipping portion of the first flexible tab extending substantially perpendicularly from one side wall of the first pair of the side walls and adapted to contact a front surface of the window shade module when the window shade module is installed within the volume to resist movement of the window shade module in a direction away from the planar panel, and
   at least a second flexible tab arranged at the other side wall of the first pair of the side walls, a clipping portion of the second flexible tab extending substantially in a same direction as the other side wall of the first pair of side walls and adapted to exert force on at least one of a side surface and the front surface of the window shade module when the window shade module is installed within the volume.

2. The system of claim 1, wherein the receptacle frame further comprises a receptacle frame port formed in one of the side walls and positioned to align with the electrical access port of the aircraft exterior sidewall window panel.

3. The system of claim 2, further comprising a receptacle frame electrical assembly which comprises:
   an aircraft power bus electrical connector installed in the receptacle frame port and adapted to interface with an aircraft electrical power bus, and
   a window shade electrical connector which is electrically connected to the aircraft power bus electrical connector.

4. The system of claim 3, wherein the electrical conductors connecting the window shade electrical connector to the aircraft power bus electrical connector comprise conductor lines formed on a printed circuit board.

5. The system of claim 3, further comprising a switch connected to the window shade electrical connector and adapted to control the window shade module.

6. The system of claim 1, wherein the receptacle frame is formed of a resilient plastic material.

7. The system of claim 1, wherein the window shade module fasteners are integrally formed with the receptacle frame.

8. The system of claim 1, wherein the first pair of the side walls on which the window shade module fasteners are positioned are opposing side walls.

9. The system of claim 1, wherein the first and second flexible tabs are adapted to exert compression force on the window shade module when the window shade module is installed within the volume.

10. The system of claim 9, wherein the window shade module fasteners further comprise alignment tabs which extend inward from a second pair of the side walls into the volume for receiving the window shade module.

11. A method for installing a motorized window shade module in an exterior sidewall of an aircraft, the aircraft having an aircraft exterior sidewall window panel having fastener receiving elements and an electrical access port, the method comprising:
   providing a rectangular receptacle frame fastenable to the aircraft exterior sidewall window panel, the receptacle frame comprising:
      a planar panel having a front face, a rear face, and an opening therethrough,
      two opposed pairs of side walls which form a rectangle bounding the front face to define a volume configured to receive the window shade module,
      window panel fasteners on the rear face adapted to engage with the fastener receiving elements of the aircraft exterior sidewall window panel and adapted to secure the receptacle frame to the aircraft exterior sidewall window panel,
      a receptacle frame port formed in one of the side walls and positioned to align with the electrical access port of the aircraft exterior sidewall window panel,
      a receptacle frame electrical assembly comprising an aircraft power bus electrical connector installed in the receptacle frame port and adapted to interface with an aircraft electrical power bus, and
      window shade module fasteners provided for at least a first pair of the two opposed pairs of side walls and adapted to secure the window shade module within the volume for receiving the window shade module,
   wherein the window shade module fasteners comprise:
      at least a first flexible tab, a clipping portion of the first flexible tab extending substantially perpendicularly from one side wall of the first pair of the side walls and adapted to contact a front surface of the window shade module when the window shade module is installed within the volume to resist movement of the window shade module in a direction away from the planar panel, and at least a second flexible tab arranged at the other side wall of the first pair of the side walls, a clipping portion of the second flexible tab extending substantially in a same direction as the other side wall of the first pair of side walls and adapted to exert force on at least one of a side surface and the front surface of the window shade module when the window shade module is installed within the volume;

inserting a first end of the window shade module into the volume for receiving the window shade module at an angle relative to the front face of the receptacle frame so that the first end of the window shade module is positioned between the first flexible tab and the front face of the receptacle frame, the first flexible tab flexing outward as the window shade module is inserted; and rotating the window shade module about the first end thereof so that a second end of the window shade module moves into the volume for receiving the window shade module and becomes secured by the second flexible tab, wherein as the window shade module is inserted and rotated, the window shade electrical connector installed in the receptacle frame port forms an electrical connection with the window shade assembly.

12. The method of claim 11, wherein an edge of the second flexible tab is adapted to be engaged by the second end of the window shade module as it moves into the volume for receiving the window shade module, thereby bending the second flexible tab so that the window shade module can completely enter the volume and then allow the second flexible tab to seat in a position at least partially in front of the window shade module.

13. The method of claim 11, wherein the second flexible tab is adapted to be bent away from the volume for receiving the window shade module using a tool so that the window shade module can completely enter the volume and then allow the second flexible tab to seat in a position at least partially in front of the window shade module.

14. The method of claim 11, wherein the flexible tabs are adapted to exert compression force on the window shade module when the window shade module is installed within the volume.

15. The method of claim 11, wherein the receptacle frame electrical assembly further comprises a window shade electrical connector which is electrically connected to the aircraft power bus electrical connector via electrical conductors.

16. The system of claim 1, wherein the receptacle frame further comprises a protruding surface surrounding the opening and extending from the rear face in a rearward direction.

17. The system of claim 1, wherein the first pair of sidewalls forms a top sidewall and a bottom sidewall of the receptacle frame.

* * * * *